United States Patent
Ghabra et al.

(10) Patent No.: US 8,284,020 B2
(45) Date of Patent: Oct. 9, 2012

(54) PASSIVE ENTRY SYSTEM AND METHOD FOR A VEHICLE

(75) Inventors: Riad Ghabra, Dearborn Heights, MI (US); Nikolay Yakovenko, West Bloomfield, MI (US); Hilton (Jerry) W. Girard, III, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 442 days.

(21) Appl. No.: 12/644,442

(22) Filed: Dec. 22, 2009

(65) Prior Publication Data

US 2011/0148573 A1 Jun. 23, 2011

(51) Int. Cl.
*G05B 19/00* (2006.01)
(52) U.S. Cl. .................................... 340/5.61
(58) Field of Classification Search ............... 340/5.61, 340/5.72, 539.1, 513, 426.13, 426.22; 307/10.1
See application file for complete search history.

(56) References Cited

U.S. PATENT DOCUMENTS

| | | | |
|---|---|---|---|
| 4,873,530 A | 10/1989 | Takeuchi et al. | |
| 4,942,393 A | 7/1990 | Waraksa et al. | |
| 5,157,389 A | 10/1992 | Kurozu et al. | |
| 5,499,022 A | 3/1996 | Boschini | |
| 5,751,073 A | 5/1998 | Ross | |
| 5,973,611 A | 10/1999 | Kulha et al. | |
| 6,049,268 A | 4/2000 | Flick | |
| 6,208,239 B1 | 3/2001 | Muller et al. | |
| 6,236,333 B1 | 5/2001 | King | |
| 6,522,241 B1 | 2/2003 | Baudard | |
| 6,621,178 B2 | 9/2003 | Morillon | |
| 6,658,328 B1 | 12/2003 | Alrabady et al. | |
| 6,778,065 B1 | 8/2004 | Asakura et al. | |
| 6,853,296 B2 | 2/2005 | Chandebois | |
| 6,906,612 B2 | 6/2005 | Ghabra et al. | |
| 6,937,136 B2 | 8/2005 | Greenwood et al. | |
| 6,943,664 B2 | 9/2005 | Brillon et al. | |
| 6,950,008 B2 | 9/2005 | Hagl et al. | |
| 7,046,119 B2 | 5/2006 | Ghabra et al. | |
| 7,098,769 B2 | 8/2006 | Ott | |
| 7,230,577 B2 | 6/2007 | Tanaka | |
| 7,245,200 B2 | 7/2007 | Inoguchi | |
| 7,292,137 B2 | 11/2007 | Gilbert et al. | |
| 7,446,648 B2 | 11/2008 | Ghabra | |
| 2004/0005868 A1* | 1/2004 | Desjeux et al. | 455/90.1 |
| 2004/0217850 A1 | 11/2004 | Perttunen et al. | |

(Continued)

FOREIGN PATENT DOCUMENTS

DE 102006016495 A1 11/2006

(Continued)

OTHER PUBLICATIONS

German Patent Office, Office Action for the corresponding German Patent Application No. 10 2010 062 092.0 mailed Mar. 16, 2012.

*Primary Examiner* — Vernal Brown

(74) *Attorney, Agent, or Firm* — Brooks Kushman P.C.

(57) ABSTRACT

A passive entry system and method for determining the location of a remote transmitter positioned near a vehicle. The system and method may include an irregularly shaped authorization zone. The authorization zone may be formed using as least three LF antennas. Alternatively, at least two antennas may be used to form at least one elliptically shaped authorization zone. A controller may determine the location of the fob when the fob is physically positioned within the authorization zone.

13 Claims, 4 Drawing Sheets

U.S. PATENT DOCUMENTS

| | | |
|---|---|---|
| 2004/0227615 A1 | 11/2004 | John et al. |
| 2004/0233047 A1 | 11/2004 | King et al. |
| 2006/0114100 A1 | 6/2006 | Ghabra et al. |
| 2006/0145809 A1 | 7/2006 | Crowhurst |
| 2006/0255906 A1 | 11/2006 | Ghabra et al. |
| 2006/0255908 A1 | 11/2006 | Gilbert et al. |
| 2007/0090965 A1 | 4/2007 | Mc Call |
| 2007/0200670 A1 | 8/2007 | McBride et al. |
| 2008/0048829 A1* | 2/2008 | Nakajima et al. ............ 340/5.72 |
| 2008/0231416 A1 | 9/2008 | Marlett et al. |
| 2008/0232431 A1* | 9/2008 | Sanji et al. .................... 375/130 |

FOREIGN PATENT DOCUMENTS

DE  102008015477 A1  10/2008

* cited by examiner

PASSIVE ENTRY SYSTEM AND METHOD FOR A VEHICLE

TECHNICAL FIELD

One or more embodiments of the present disclosure relate to a passive entry system that may be used to determine the location of a remote transmitter relative to a vehicle.

BACKGROUND

Exemplary passive entry systems for vehicles are described in U.S. Pat. No. 6,906,612 issued to Ghabra et al. and entitled "System and Method for Vehicle Passive Entry Having Inside/Outside Detection;" U.S. Pat. No. 7,446,648 issued to Ghabra and entitled "Passive Activation Vehicle System Alert;" U.S. Pat. No. 4,873,530 issued to Takeuchi et al. and entitled "Antenna Device In Automotive Keyless Entry System;" U.S. Pat. No. 4,942,393 issued to Waraksa et al. and entitled "Passive Keyless Entry System;" U.S. Pat. No. 5,499,022 issued to Boschini and entitled "Remote Control System For Locking And Unlocking Doors And Other Openings In A Passenger Space, In Particular In A Motor Vehicle;" U.S. Pat. No. 5,751,073 issued to Ross and entitled "Vehicle Passive Keyless Entry And Passive Engine Starting System;" U.S. Pat. No. 6,049,268 issued to Flick and entitled "Vehicle Remote Control System With Less Intrusive Audible Signals And Associated Methods;" and U.S. Pat. No. 6,236,333 issued to King and entitled "Passive Remote Keyless Entry System."

SUMMARY OF THE INVENTION

A method and system of determining the location of a fob is disclosed. The method and system may include at least three antennas located about the vehicle. The antennas may be capable of transmitting a Low Frequency (LF) signal to a fob. The fob may receive the LF signal and determine a received signal strength indication (RSSI) of each received LF signal. The fob may transmit one or more UHF signals that include the RSSI. A controller may be configured to receive the one or more signals from the fob and compare the received signal amplitudes against a predefined authorization zone. The predefined authorization zone may include a number of inclusion and exclusion areas. At least one authorization zone may be circularly shaped with a central point radiating from each of the at least three antennas. The controller may further be configured to determine the location of the fob by determining if the fob is located within either the exclusion or inclusion areas.

An alternate method and system of determining the location of a fob is disclosed. The method and system may include at least two antennas located about the vehicle. The antennas may be capable of transmitting a Low Frequency (LF) signal to a fob. The fob may receive the LF signal and determine a received signal strength indication (RSSI) of each received LF signal. The fob may transmit one or more UHF signals that include the RSSI of the at least two received antennas. A controller may be configured to receive the signal from the fob and compare the received signal amplitudes against a predefined authorization zone. At least one of the authorization areas may be an elliptically shaped authorization area established using at least two antennas. The controller may determine the location of the fob by determining if the fob is located within the one elliptically shaped authorization area.

DETAILED DESCRIPTION OF ILLUSTRATIVE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
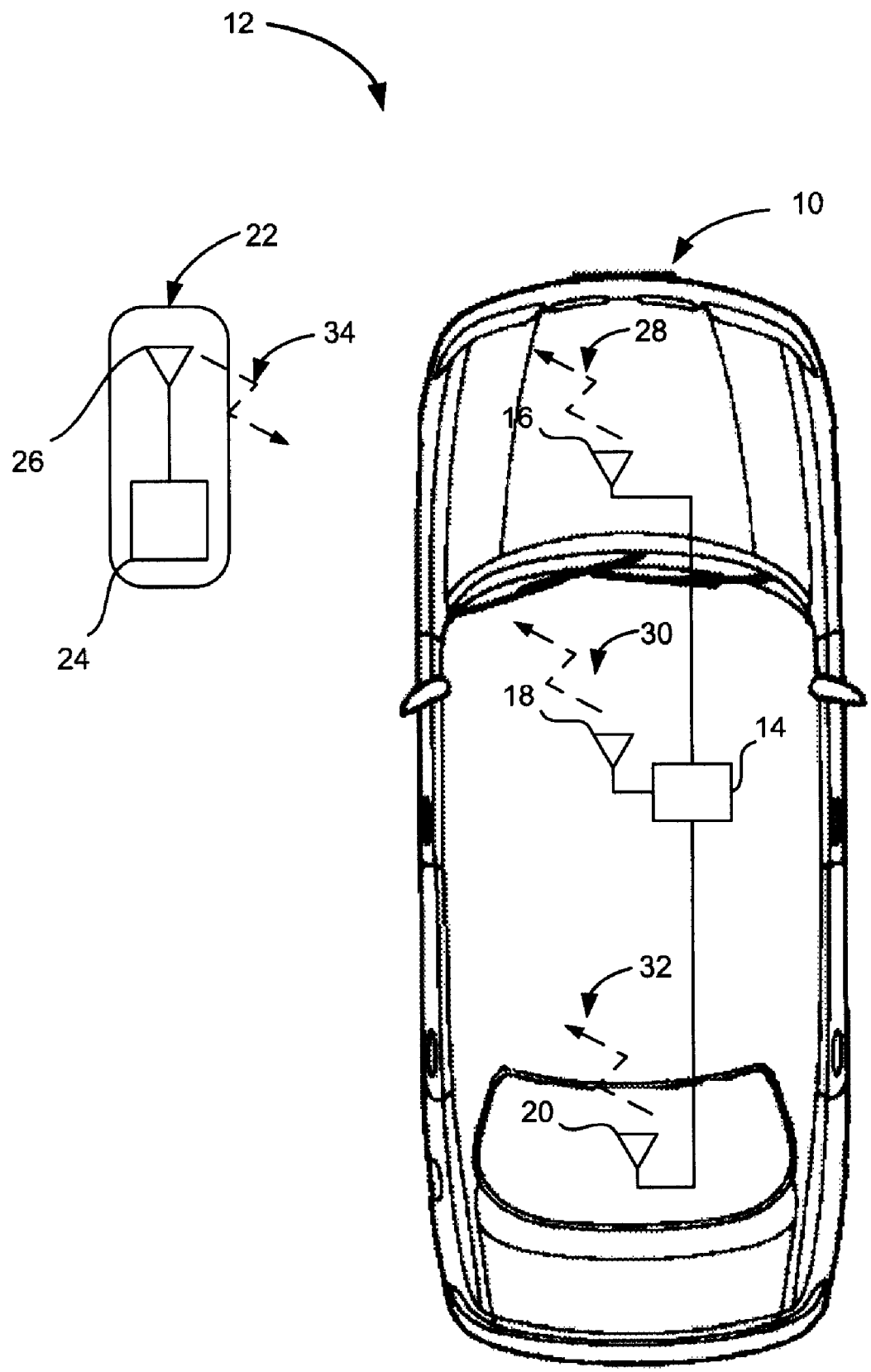
FIG. 1 is a top view of a vehicle that includes a passive entry system according to one non-limiting embodiment of the present disclosure.

With reference to FIG. 1, a vehicle 10 is illustrated which may include a passive entry system, denoted generally by reference numeral 12, according to one non-limiting aspect of the present disclosure. The passive entry system 12 may include a vehicle controller 14 located within vehicle 10. The vehicle controller 14 may further include one or more transceiver units having a receiver and/or transmitter unit that communicate with one or more antennas 16, 18, 20 positioned about vehicle 10. The present disclosure contemplates that the transceiver units may be separate from the vehicle controller 14 and may be positioned about, or included in combination with antennas 16, 18, 20. The vehicle controller 14 may further be configured to operate a door lock mechanism (not shown), start the ignition of the vehicle 10 and/or perform a variety of other functions related to the operation of the vehicle 10.

The passive entry system 12 may further include a remote hand held transmitter, which is conventionally referred to as a fob 22, which may be carried and/or operated by an operator. The fob 22 may be a separate unit, or may be part of an ignition key head. The fob 22 may include a fob controller 24 having a transceiver unit. The transceiver unit may include a transmitter and receiver for receiving and/or transmitting signals from the fob 22. The present disclosure also contemplates that the transceiver unit may be separate from the fob controller 24. The fob 22 may further include an antenna 26 configured to send and/or receive signals to and/or from antennas 16, 18, 20.

The present disclosure contemplates that one or more signals 28, 30, 32 may be transmitted from the antennas 16, 18, 20 without an operator activating a switch or pushbutton on the fob 22. The signals 28, 30, 32 may include a wakeup signal intended to activate a corresponding fob 22. In turn, the fob 22 may receive the signals 28, 30, and determine the strength or intensity of the signals 28, 30, 32.

Figure 2:
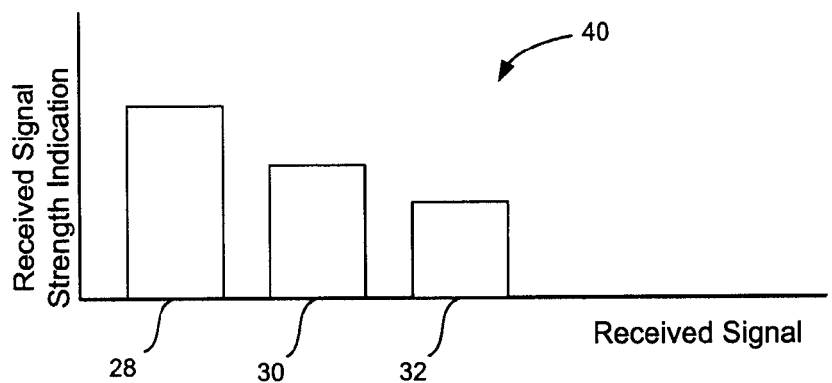
FIG. 2 is a graph illustrating an exemplary set of signals received by the passive entry system.

For example, FIG. 2 illustrates a graph 40 of the signals 28, 30, 32 respectively transmitted by antennas 16, 18, 20 that may be received by the fob 22. The graph 40 illustrates the strength or intensity of each received signal 28, 30, 32, more commonly referred to as the Received Signal Strength Indication (RSSI). Based upon the determined RSSI levels of each signals 28, 30, 32, the fob controller 24 may determine a position report indicating the distance of the fob 22 relative to each antenna 16, 18, 20. The present disclosure contemplates that the location of the fob 22 may also be determined using a predefined series of calibrated values that equate the determined RSSI value to a distance value.

The fob 22 may then transmit a response signal 34 that includes the position report to the antennas 16, 18, 20. The vehicle controller 14 may determine the location of the fob by verifying whether the received response signal 34 indicates that the fob 22 is located within a valid authorization zone. If so, the vehicle controller 14 may begin an authentication/response challenge sequence between the vehicle controller 14 and the fob 22. Upon a successful authentication/response sequence, the vehicle controller 14 may determine whether a particular vehicle function should be performed if the fob 22 is within some pre-defined distance, or location, relative to the vehicle 10.

For example, if the fob 22 is located within a predefined authorization zone outside the vehicle 10, the controller 12 may activate one or more door lock mechanisms (not shown) to unlock one or more of the vehicle doors. Alternatively, if the fob 22 is located within a predefined authorization zone within the cabin of the vehicle 10, the vehicle controller 14 may activate the ignition of the vehicle 10.

The present disclosure further contemplates that antenna 26 located within the fob 22 may be configured to transmit long-range ultra-high frequency (UHF) signals to the antennas 16, 18, 20 of the vehicle 10 and receive short-range Low Frequency (LF) signals from the antennas 16, 18, of the vehicle 10. However, the present disclosure contemplates that separate antennas may be included within the fob 22 to transmit the UHF signal and receive the LF signal. In addition, the antennas 16, 18, 20 may be configured to transmit LF signals to the fob 22 and receive UHF signals from the antenna 26 of the fob 22. However, the present disclosure contemplates that separate antennas may be included within the vehicle 10 to transmit LF signals to the fob 22 and receive the UHF signal from the fob 22.

The fob 22 may also be configured so that the fob controller 24 may be capable of switching between one or more UHF channels. As such, the fob controller 24 may be capable of transmitting the response signal 34 across multiple UHF channels. By transmitting the response signal 34 across multiple UHF channels, the fob controller 24 may ensure accurate communication between the fob 22 and the antennas 16, 18, 20.

Figure 3:
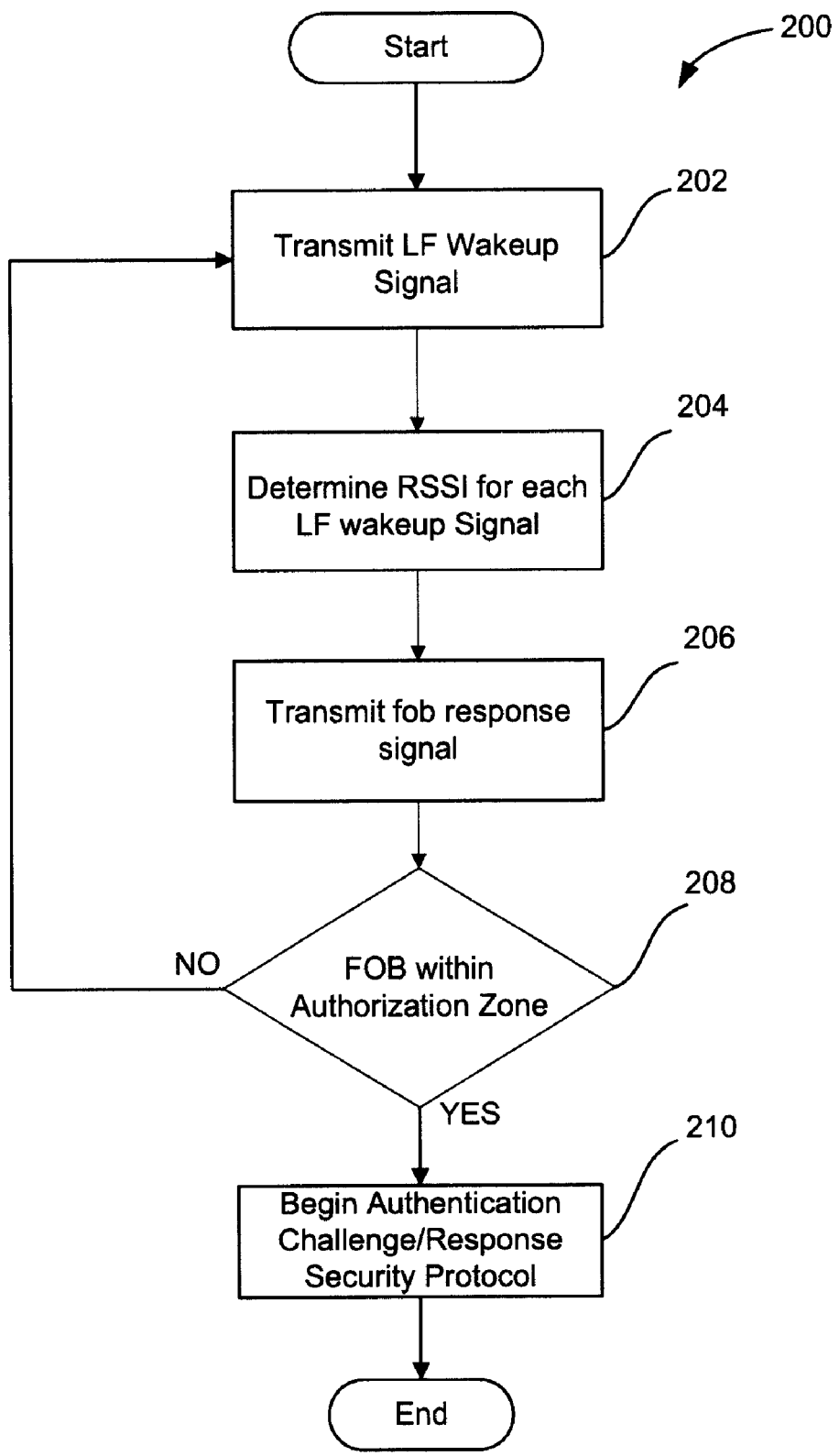
FIG. 3 is an exemplary flow diagram for determining the location of a FOB relative to the vehicle.

FIG. 3 illustrates an exemplary, flow diagram 200 according to one or more embodiments of the present application. However, it should be noted that the flow diagram 200 illustrated in FIG. 3 is merely exemplary and the operation, function, or steps of the flow diagram 200 may be performed in a fashion other than the order described herein.

The flow diagram 200 may begin at operation 202 with an LF wakeup sequence that may include one or more wakeup signals being sent by the vehicle controller 14 to the fob 22. Upon receiving the LF wakeup sequence, the flow diagram 200 may proceed to operation 204.

In operation 204, the fob controller 24 may determine the RSSI of each received LF wakeup signal. Once the fob controller 24 determines the RSSI of each LF wakeup signal, the flow diagram 200 may proceed to operation 206.

In operation 206, the fob controller 24 may transmit the fob response signal which includes the RSSI value of each antenna 16, 18, 20 as determined by the fob controller 24. Once the fob response signal has been transmitted, the flow diagram proceeds to operation 208.

In operation 208, the vehicle controller 14 determines the location of the fob 22 using the received fob response signal. The vehicle controller 14 may determine the location by determining if the received fob response signal indicates that the fob 22 is within a predefined authorization zone.

For example, in one non-limiting embodiment of the present disclosure, the authorization zone may be established using a series of inclusion and exclusionary criteria based on the RSSI of each antenna 16, 18, 20. The present disclosure contemplates that the authorization zone may be any irregular geometrical shape so long as the span of the shape is confined to the coverage of the LF antennas.

Using the irregular shaped authorization zone, the fob controller 24 may incorporate a triangulation verification procedure using the RSSI of each antenna 16, 18, 20 to determine if the fob 22 is located within the boundaries of the authorization zone. The fob controller 24 may begin the triangulation verification procedure by first determining whether the fob 22 is located within any specified exclusion area. If the vehicle controller 14 determines that the fob 22 is located within one of the exclusionary areas, the fob 22 may be denied access to the authorization zone. If the fob controller 24 determines that the fob 22 is not located within at least one of the exclusion areas, then the fob controller 24 may determine if the fob 22 is located within at least one specified inclusion areas. If the fob controller 24 determines that the fob 22 is located within at least one of the inclusion areas, then the fob 22 may be allowed access to the requested authorization zone.

Figure 4:
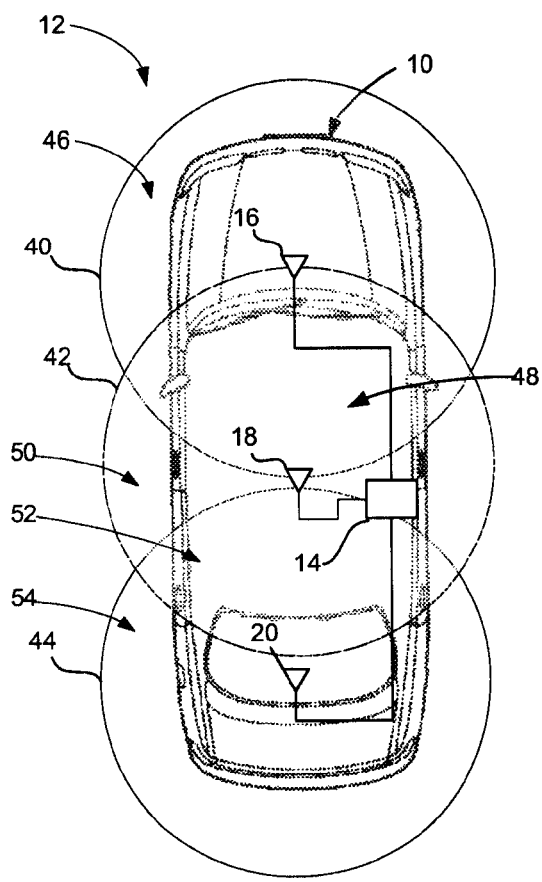
FIG. 4 is another top view of the vehicle that includes an exemplary passive entry authorization area.

For example, FIG. 4 illustrates an exemplary irregular shaped authorization area. As illustrated, each antenna 16, 18, 20 may be configured to radiate a circular shape 40, 42, 44. The radiation pattern may extend from a central point starting at each respective antenna 16, 18, 20 outward toward the circumference of each shape 40, 42, 44. Furthermore, the vehicle controller 14 may use the shapes 40-44 to define one or more authorization zones having a number of exclusion and inclusion areas.

The fob controller 24 may determine the authorization area based upon well known Boolean principles. For example, the exclusion/inclusion area criterion may be defined using following exemplary, equation:

$$(a \leq X \leq b) \text{ AND } (c \leq Y \leq d) \text{ AND } (e \leq Z \leq f) \quad (1)$$

Where,
X is the RSSI value of antenna 16;
Y is the RSSI value of antenna 18;
Z is the RSSI value of antenna 20;
a, b, c, d, e, f are a set of predefined constants.

Using Equation (1), a geometrical interpretation may be defined for the circular shapes 40, 42, and 44. For example, if the predefined values were established as a=100, b=255, c=0, d=255, e=0 and f=255, the vehicle controller 14 may determine that the fob 22 is located within the authorization zone when the RSSI value of antenna 16 is greater than 100. Since each RSSI value may be converted to a distance value, there will be circle around each antenna 16, 18, 20 where the fob 22 may be detected.

Another non-limiting example of an inclusion/exclusion area criterion may be defined using the following exemplary, equation:

$$[(100 \leq X) \text{ AND } (0 \leq Y) \text{ AND } (0 \leq Z)] \text{ OR } [(0 \leq X) \text{ AND } (100 \leq Y) \text{ AND } (0 \leq Z)] \text{ OR } [(0 \leq X) \text{ AND } (0 \leq Y) \text{ AND } (100 \leq Z)] \quad (2)$$

As illustrated by Equation (2), the vehicle controller 14 may determine that the fob 22 is within an excluded area only if the RSSI value of each antenna 16, 18, and 20 was determined to be zero (0). Conversely, if the vehicle controller 14 verifies that the RSSI value of antenna 16, 18, or 20 is greater or equal to 100, then the vehicle controller 14 will determine that the fob 22 is located within one of the inclusion areas.

Using predefined Boolean criterion, any number of authorization zones by be established by the vehicle controller 14. For example, with reference to FIG. 4, the vehicle controller 14 may define the authorization areas as the region surrounding the vehicle doors using the following exemplary, equation:

$$[(100 \leq X) \text{ AND } (100 \leq Y)] \text{ OR } (100 \leq Y) \text{ OR } [(100 \leq Y) \text{ AND } (100 \leq Z)] \quad (3)$$

Using the Boolean criteria established in Equation (3), the inclusion areas for FIG. 4 may be defined as the areas 48, 50, and 52. Conversely, the exclusion areas may be defined by areas 46 and 54.

Using the triangulation verification procedure, the vehicle controller 14 may first attempt to determine whether the fob 22 is located within at least one of the exclusion areas 46 and 54. If yes, the vehicle controller 14 may deny the fob 22 access to the requested authorization zone. However, if the fob 22 is not located within at least one of the exclusion areas, the vehicle controller 14 may determine whether the fob 22 is located within at least one of the inclusion areas 48, 50, and 52. If yes, the vehicle controller 14 may unlock one or more of the vehicle doors after a successful authentication security protocol is completed.

Figure 5:
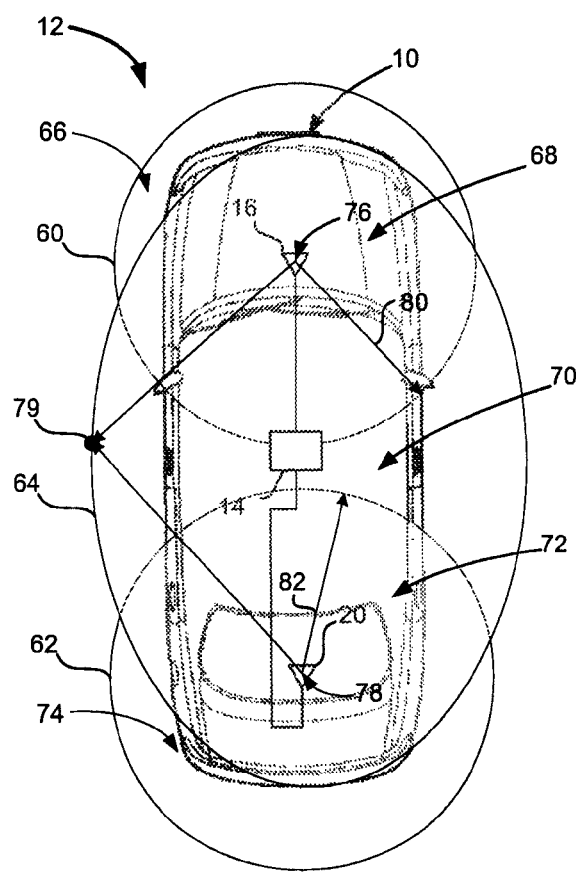
FIG. 5 is another top view of the vehicle that includes an alternate exemplary passive entry authorization area.

In another non-limiting embodiment, FIG. 5 illustrates that the authorization zone may be defined using only two of the antennas 16, 20. As illustrated, the authorization zone may be determined using a pair of spherical or circular shapes 60, 62 whose central point radiates outward from antennas 16, 20, respectively. Also, each antenna 16, 20 may be used to define the foci of an elliptical shape 64. The vehicle controller 14 may use the elliptical shape 64 to define an authorization zone for the cabin area of the vehicle 10.

Using the elliptical authorization zone illustrated in FIG. 5, the fob controller 24 may not need to determine the absolute location of the fob 22 using the triangulation verification procedure as described above with reference to FIG. 4. Using the characteristic shape of the ellipse, an authorization zone may be based on the signal amplitudes from each antenna 16, 20. Furthermore, the fob controller 24 may determine the location of the fob 22 by verifying whether the fob 22 is located within the boundaries of elliptically shaped authorization zone.

The present disclosure contemplates that using elliptical interpolation to define the cabin area of the vehicle 10 may be advantageous since only two antennas are required. Furthermore, by using elliptical interpolation, the two antennas 16, 20 may operate to define a pair of foci 76, 78 of the elliptical shape 64, as well as, a pair of radii 80, 82 for each circular shape 60, 62. Hence, the two antennas 16, 20 may operate to form three geometrical shapes (i.e., circular shapes 60, 62 and elliptical shape 64).

The present disclosure further contemplates that antennas 16, 20 may be positioned within the vehicle 10 so as to be along the major axis of the elliptical shape 64. Furthermore, the antennas 16, 20 may be positioned within the vehicle 10 so as to operate as a pair of foci 76, 78 for the elliptical shape 64.

As such, the vehicle controller 14 may determine the curvature of the elliptical shape 64 by determining the major diameter and the distance between the pair of foci 76, 78. The present disclosure contemplates that the distance between the foci 76, 78 may be determined by the vehicle controller 14 as the distance between antennas 16, 20. Because the location of the antennas 16, may be predetermined, the distance between the pair of foci 76, 78 may also be predetermined. The present disclosure further contemplates that the vehicle controller 14 may determine the major diameter by summing the distances from a point 79 along the elliptical shape 64 to the pair of foci 76, 78. The vehicle controller 14 may also be capable of varying the size of the elliptical shape 64 by modifying the major diameter.

Therefore, regardless of the point 79 selected along the edge of the elliptical shape 64, the sum of the distances from the two foci 76, 78 to the point 79 may equate to a constant value (i.e., 76+78=Constant). As such, the vehicle controller 14 may be able to define the authorization zone for the elliptical shape 64 using the following, exemplary equation:

$$(X+Z) \geq D \quad (4)$$

Where,

X is the RSSI value of antenna 16;

Z is the RSSI value of antenna 20; and

D is the constant value that may characterize the ellipse along with the distance between the two foci 76, 78.

As illustrated by Equation (4), the fob controller 24 may determine that the fob 22 is located within the elliptical authorization area when the sum of the RSSI signals X and Z is greater than the constant that characterizes the elliptical shape 64. The present disclosure also contemplates that the vehicle controller 14 may determine the distance from the fob 22 to the antennas 16, 20 by converting the RSSI values X and Z to distance values (X', Z'). As such, the vehicle controller 14 may determine whether the fob 22 is located within the region of the elliptical shape 64 if the sum of distance values (X', Z') is less than the major diameter of the elliptical shape 64.

Figure 6:
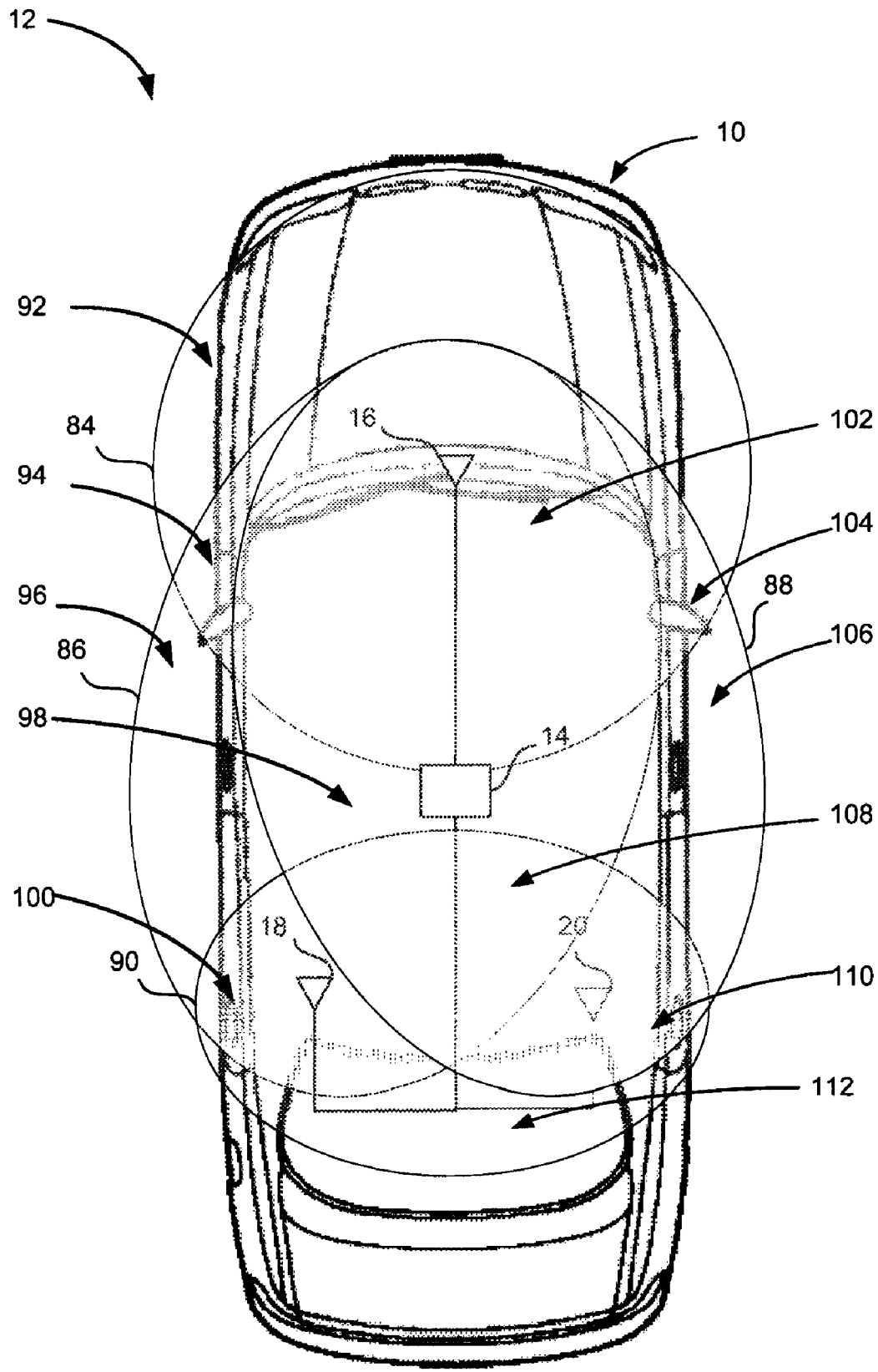
FIG. 6 is another top view of the vehicle that includes an alternate exemplary passive entry authorization area.

With reference back to the drawings, FIG. 6 illustrates another non-limiting embodiment of the present disclosure. Again, three antennas 16, 18, 20 may be used to provide multiple authorization zones using both circular and elliptical shapes that cover the entire cabin area. As illustrated, a circular shape 84 may be defined using antenna 16. In addition, an elliptical shape 86 may be formed using antennas 16 and 18 and another elliptical shape 88 may be formed using antennas 16 and 20. Lastly, another elliptical shape 90 may be formed using antennas 18 and 20.

By configuring the antennas 16, 18, 20 as shown in FIG. 6, a greater number of inclusion/exclusion areas 92, 94, 96, 98, 100, 102, 104, 106, 108, 110, and 112 may be formed. FIG. 6 also illustrates that three elliptical authorization zones 86, 88, and 90 may be established. Each elliptical authorization zone 86, 88, and 90 may allow the controller to more accurately determine the location of the fob 22 relative to the interior or exterior of the vehicle 10. Furthermore, the use of three separate elliptical authorization zones 86, 88, and 90 may allow the vehicle controller 14 the ability to determine the location of the fob 22 without having to proceed with the triangulation verification procedure.

With reference back to FIG. 3, if the vehicle controller 14 determines the fob 22 to be within the authorization zone, flow diagram 200 proceeds to operation 210. However, if the vehicle controller 14 does not determine that the fob 22 is located within at least one of the authorization zones, flow diagram 200 proceeds back to operation 202.

In operation 210, the vehicle controller 14 may begin the authentication security protocol with the fob 22 that is determined to be located within one of the authorization zones. The authentication security protocol may include an authentication challenge signal transmitted by one or more of the antennas 16, 18, 20. In return, the fob 22 may transmit a response authentication signal to the vehicle controller 14. If the vehicle controller 14 determines the response authentication signal to be valid, the vehicle controller 14 may perform a particular vehicle operation (e.g., start the ignition of the vehicle or unlock one or more of the vehicle doors).

While embodiments of this disclosure may have been illustrated and described, it is not intended that those embodiments illustrate and describe the only embodiments of the disclosure. Rather, the words used in the above disclosure are words of description, rather than limitations and it should be understood that various changes may be made to the above description without departing with the spirit and scope of the disclosure. Thus, specific details disclosed are merely representative basis for teaching one skilled in the art to practice the present disclosure.

What is claimed:

1. A method for determining the location of a remote transmitter positioned near a vehicle, the method comprising:
   transmitting at least two measuring signals to a remote transmitter, the at least two measuring signals being transmitted from a first and second antenna positioned about the vehicle;
   receiving an acknowledgement signal in response to the measuring signal from the remote transmitter, wherein the acknowledgement signal includes a received signal strength indication (RSSI) for each measuring signal received;
   establishing an authorization zone using an elliptical shape, the elliptical shape being established using the first antenna to establish a first focus point and the second antenna to establish a second focus point, and the authorization zone having at least one inclusion area and at least one exclusion area, wherein the at least one inclusion and exclusion area are established using the RSSI from each measuring signal received;
   determining a constant value using the sum of the distances from the first focus point and second focus point, wherein the constant value is used to define the curvature of the elliptical shape;
   determining the location of the remote transmitter by comparing whether the acknowledgment signal indicates that the remote transmitter is positioned within the authorization zone; and
   determining that the remote transmitter is located within the at least one inclusion area when the sum of the RSSI from each measuring signal received is less than the constant value.

2. The method of claim 1 further comprising:
   determining if the remote transmitter is located within at least one exclusion area.

3. The method of claim 1 further comprising:
   determining if the remote transmitter should be granted access to a requested vehicle operation using an authentication security protocol, the authentication security protocol being performed when it is determined that the remote transmitter is located within at least one inclusion area; and
   granting the remote transmitter access to the vehicle operation requested.

4. The method of claim 1 wherein each measuring signal is transmitted using a low frequency (LF) signal.

5. The method of claim 1 wherein the acknowledgement signal is transmitted using an ultra high frequency (UHF) signal.

6. The method of claim 5 wherein the acknowledgement signal is transmitted using multiple UHF signals.

7. The method of claim 1 further comprising:
   converting the RSSI from the first measuring signal to a first distance value, the first distance value being equal to the distance between the first antenna and the remote transmitter;
   converting the RSSI from the second measuring signal to a second distance value, the second distance value being equal to the distance between the second antenna and the remote transmitter; and
   determining that the remote transmitter is located within the inclusion area when the sum of the first and second distance values is less than the major diameter of the elliptical shape.

8. The method of claim 1 further comprising:
   transmitting at least a third measuring signal to the remote transmitter using at least a third antenna;
   establishing the authorization zone using the first, second, and third antennas to establish at least a first, second and third elliptical shape, and establishing the authorization zone using the first, second, and third antennas to establish at least a first, second, and third circular shape; and
   determining the location of the remote transmitter by comparing whether the acknowledgment signal indicates that the remote transmitter is positioned within the authorization zone.

9. A system for determining the location of a remote transmitter positioned near a vehicle, the system comprising:
   at least first and second antennas located about the vehicle, the first and second antennas respectively transmitting first and second measuring signals to a remote transmitter; and
   a controller configured to:
   receive an acknowledgement signal from the remote transmitter in response to the measuring signal, wherein the acknowledgement signal includes a received signal strength indication (RSSI) for each measuring signal received;
   establish an authorization zone using an elliptical shape, the elliptical shape being established using the first antenna to establish a first focus point and the second antenna to establish a second focus point, and the authorization zone having at least one inclusion area and at least one exclusion area, wherein the at least one inclusion and exclusion area are established using the RSSI from each measuring signal received;
   determine a constant value using the sum of the distances from the first focus point and the second focus point, wherein the constant value is used to define the curvature of the elliptical shape;
   determine the location of the remote transmitter by verifying whether the acknowledgment signal indicates that the remote transmitter is positioned within the authorization zone; and
   determine that the remote transmitter is located within the at least one inclusion area when the sum of the RSSI from each measuring signal received is less than the constant value.

10. The system of claim 9, wherein the controller is further configured to:
    determine if the remote transmitter is located within at least one exclusion area; and deny the remote transmitter access to a particular vehicle operation when the remote transmitter is located within at least one exclusion area.

11. The system of claim 9, wherein the controller is further configured to:
grant the remote transmitter access to the particular vehicle operation when the remote transmitter is located within at least one inclusion area.

12. The system of claim 9 wherein the acknowledgement signal is a ultra high frequency (UHF) signal.

13. The system of claim 9 wherein each measuring signal is transmitted using a low frequency (LF) signal.

* * * * *